Figure 1:
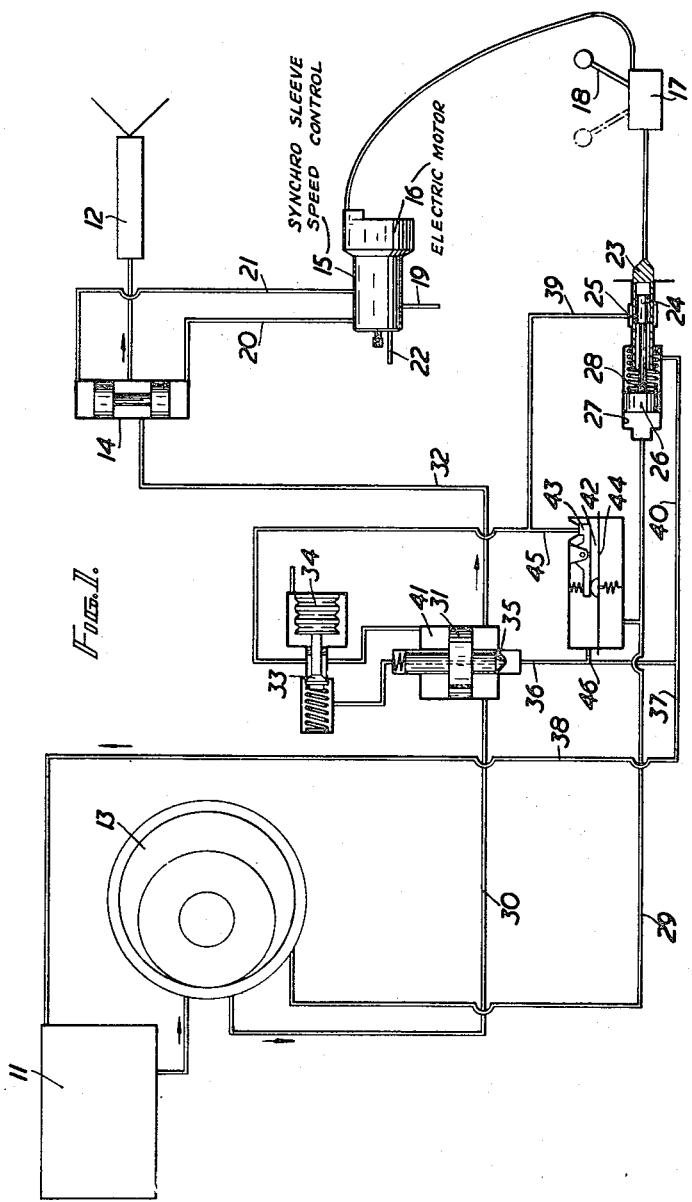

July 10, 1951

F. H. CAREY 2,559,938

SPEED GOVERNOR MECHANISM FOR AIRCRAFT
INTERNAL-COMBUSTION TURBINE ENGINES

Filed Nov. 30, 1948

2 Sheets-Sheet 2

Inventors
FREDERICK H. CAREY,
By Reynolds & Beach
Attorneys

UNITED STATES PATENT OFFICE 2,559,938

SPEED GOVERNOR MECHANISM FOR AIRCRAFT INTERNAL-COMBUSTION TURBINE ENGINES

Frederick Henry Carey, Cheltenham, England, assignor to Dowty Equipment Limited, Cheltenham, England Application November 30, 1948, Serial No. 62,636
In Great Britain December 3, 1947

6 Claims. (Cl. 60—41)

This invention is concerned with fuel supply systems for aircraft internal combustion turbine engines, in which there is provided between the throttle or metering valve and the pilot's throttle control some form of governing mechanism or synchronising mechanism, hereinafter referred to as the speed governing mechanism, whereby the setting of the pilot's control will select an engine speed and maintain that speed irrespective of changing altitude or varying loads on the engine. An example of such mechanism in the form of a synchronising mechanism is described in my co-pending Patent application Serial No. 766,003, filed August 4, 1947. With such installations it is desirable to arrange for the speed governing mechanism to respond to a change in engine speed without during such change interfering with the inherent speed characteristics of the engine in order that the engine can follow its own accelerating characteristics when changing from one selected speed to another. Such a condition of operation, though affording maximum acceleration over a selected range, nevertheless introduces the danger of the engine overshooting the selected speed to a considerable extent which may be followed by a hunting action fluctuating above and below the selected speed until the selected speed is eventually attained. The aim of the present invention is to remove this danger by providing in the system variable speed-limiting means which whilst permitting the engine to follow its inherent accelerating characteristics ensures that a selected speed shall not be exceeded, or not exceeded to any appreciable extent. This is achieved in accordance with the invention by providing in the engine fuel control system variable speed-limiting means comprising a preselecting member operable from the pilot's control, and a follow-up member which executes follow-up movements in response to a signal, e. g. a pressure, which for all altitudes varies as a function of the engine speed, so that when the speed corresponding with the setting of the preselecting member is reached the follow-up member co-operates with the preselecting member to limit the quantity of fuel reaching the engine irrespective of an advanced setting of the throttle or metering valve.

The signal which varies with the speed of the engine irrespective of altitude, may conveniently be pressure tapped from a centrifuge pump which is engine driven and which may be a section of the engine fuel supply pump.

In operation, when the pilot moves his control he will set the position of the preselecting member of the speed-limiting means and at the same instance will indirectly through the speed governing mechanism bring about an alteration in the setting of the controlling element of the throttle or metering valve. If a quick-opening-up of the engine be required, the metering valve will open correspondingly to permit additional fuel to reach the engine burners which will result in the engine speeding up. The centrifugal pressure in the engine-driven pump will thus build up and result in the follow-up member of the speed-limiting means moving in relation to the preselecting member. Whenever the engine tends to exceed the speed corresponding with the setting of the preselecting member, the speed limiting means will effect a reduced limit to the pressures of a pressure-balance system, the effect of which will be to prevent any further increase in the quantity of fuel reaching the engine so that even though the controlling element of the throttle or metering valve may have overshot the position corresponding to the speed selected on the speed governing mechanism, the engine will be unable to accelerate further, the said controlling element of the metering valve eventually settling down, under the influence of the speed governing mechanism, at the correct position corresponding with the selected speed.

It is to be noted that although in an ideal arrangement the speed selected on the speed governing mechanism will be the same as the speed indicated by the setting of the preselecting member, the speed setting of the preselecting member may slightly exceed that selected on the speed governing mechanism. In such an arrangement a controlled overshoot of the selected speed of small extent is permitted which may be of assistance with some types of speed-limiting mechanism.

The preselecting and follow-up members of the speed-limiting means may co-operate to effect a reduced limit to the pressure of the pressure-balance system by permitting through their co-operation a leakage or return flow from one side of said system. So long as such co-operation persists the controlling element of the pressure-balance system will remain in a new position of equilibrium at which the pressures at either side of said member are equal at the reduced limit just mentioned, and the quantity of fuel reaching the throttle or metering valve will be correspondingly reduced.

The preselecting member of the governor may be in the form of a ported tube which is movable axially with movement of the pilot's throttle control and the follow-up member may be in the form of a piston with a stem fitting slidably within the ported tube, the piston being spring urged to tend to move the stem out of the tube and influenced by the centrifugal pressure of the pump to move against the spring.

Figure 2:
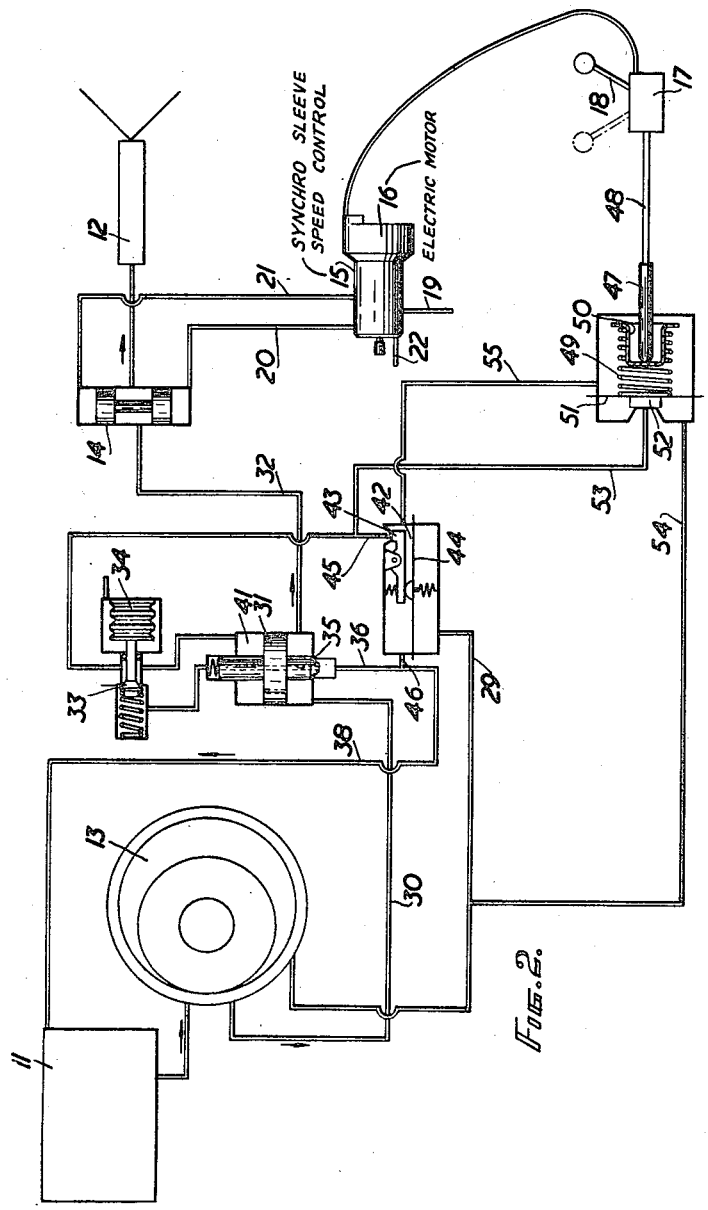

In order that the invention may be clearly understood and more readily carried into effect, two liquid fuel supply systems incorporating embodiments of the invention will now be described by way of example with reference to the accompanying diagrammatic drawings of which Figure 1 is a diagram showing one of the systems, and Figure 2 is a diagram showing the other system.

Referring first to Figure 1, liquid fuel from a tank 11 is fed to burners, one of which is shown at 12, by an engine-driven pump 13 of the fixed displacement type. Before it reaches the burners 12, the fuel passes through a throttle or metering valve 14 the position of the movable element of which is controlled hydraulically by synchronising mechanism indicated at 15. This mechanism is in accordance with application Serial No. 766,003, referred to above, including two ported sleeves of which one is adapted to be driven by the engine and the other is driven by an electric motor 16 the speed of which is controlled from a control box 17 by a pilot's control 18. The mechanism 15 has a hydraulic pressure supply line 19 leading to the ported sleeves which govern flow along one or the other of the lines 20 and 21 leading to opposite ends of the metering valve 14. When the sleeves of the mechanism 15 are in register the movable element of the metering valve 14 is hydraulically locked. If, say, the engine-driven sleeve overtakes the motor-driven sleeve, hydraulic fluid will be permitted to flow along one of the lines 20 and 21 and to return along the other of said lines, and to flow along a return line 22. If the motor-driven sleeve overtakes the other then the flow will be reversed. By these means any setting of the pilot's control 18 will correspond to a definite R. P. M. of the engine. If the pilot's control is moved through a suitable angle in order to bring about a large variation in the speed of the engine, the movable element of the metering valve 14 will over-shoot a position corresponding with the selected speed, and once the engine has reached the selected speed, a hunting action above and below this speed will occur until the valve eventually settles down at the selected speed position. It should be noted that in changing its speed the engine is free to follow its inherent accelerating characteristics. In order to overcome this drawback without interfering with the accelerating characteristics of the engine, speed-limiting means is provided between the pump and the metering valve. This includes a preselecting member 23 movable longitudinally with movement of the pilot's control 18, and a follow-up member 24. The preselecting member 23 is in the form of a small open-ended cylinder having a vent 25, and the follow-up member comprises a piston slidable within the open-ended cylinder. The follow-up member also comprises an enlarged piston 26 slidable in a cylinder 27 and influenced by a spring 28 to move in a direction to withdraw the follow-up member from the preselecting member. The outer face of the piston 26 is exposed through a pipe line 29 to centrifugal pressure developed in the casing of the pump 13.

It will be appreciated that as the pump 13 is engine-driven, the centrifugal pressure delivered by the pump will be a function of the speed of the engine.

A delivery line 30 from the pump 13 delivers fuel to the metering valve 14 through a known by-pass relief valve 31 the function of which is to maintain constant the pressure in the line 32 leading from the relief valve to the metering valve 14. The relief valve has associated with it a blow-off valve 33 which in turn is associated with a pressure bellows 34. The effect of the pressure bellows is to vary the pressure required to unseat the valve 33 as the altitude varies. During normal operation of the engine the piston member of the valve 31 will be in a position of equilibrium at which it is away from the seating 35 so that some of the fuel delivered by the pump 13 along the line 30 can by-pass back to the tank 11 along the pipe lines 36, 37 and 38. If the altitude of the aircraft varies, the engine fuel requirements will vary similarly and if there has been no change in the position of the metering valve 14 the relief valve 31 will accommodate itself in accordance with the action of the pressure bellows 34 to alter the pressure in the line 32 so as to maintain the same engine speed for the same setting of the metering valve.

If a large increase in engine speed is suddenly required the pilot will move his control 18 accordingly. This will increase the speed of the motor 16 driving one of the sleeves of the synchronising mechanism 15 and so bring about opening movement of the metering valve. At the same time the setting of the preselecting member 23 will be altered. As the engine speeds up as permitted by the metering valve, the centrifugal pressure in the pump 13 will increase and this increased pressure will act upon the end face of the piston 26 of the follow-up member 24. The follow-up member 24 will thereupon execute a follow-up movement by moving further into the cylinder of the preselecting member 23. When it has moved far enough, the port 25, which will now be uncovered, places the pipe line 39 in communication with a pipe line 40 leading to the lines 37 and 38 and thus back to the tank 11. As the line 39 communicates with the space 41 above the relief valve 31, the pressure in this space 41 will drop so that the relief valve 31 will suddenly open further to limit the quantity of fuel reaching the metering valve 14. In this way further acceleration of the engine will be prevented even though the metering valve 14 may be in an over-shot position. Once the port 25 in the preselecting member has been uncovered and the speed of the engine consequently limited, the metering valve 14 through the action of the synchronising mechanism 15 will assume the position corresponding exactly with the speed setting selected by the pilot without the engine over-shooting the selected speed.

An over-speed governor of known type is indicated at 42. This governor comprises a lever 43 which is spring biased so that it normally closes the end of a conduit 45 and thus shuts off this conduit from a conduit 46. The lever is acted upon by a diaphragm 44 which is exposed at its underside to the centrifugal pressure of the pump 13. As soon as the centrifugal pressure reaches a predetermined amount the lever 43 will be rocked to open the conduit 45 and thus place it in communication with the conduit 46. The space 41 above the relief valve 31 will then be vented to tank which will result in the relief valve 31 moving further away from its seating to prevent any further increase in the supply of fuel to the engine burners.

The system shown in Figure 2 is very similar to that already described and similar reference numerals have been used to indicate similar parts. In this embodiment, however, the preselecting and follow-up members of the speed limiting means take a different form. The preselecting member comprises an abutment member 47 which is connected with the pilot's control 18 by a rod 48 so that the longitudinal position of the abutment member 47 varies with the setting of the pilot's control 18. The follow-up member comprises a compression spring 49 bearing at one end on the abutment member 47 through a cup 50 and bearing at its other end on a diaphragm 51 carrying a closure disk 52 for a vent at the end of a pipe line 53 which corresponds with the pipe line 39 in Figure 1. The rear side of the diaphragm 51 is permanently exposed to atmospheric pressure by being in communication with the tank 11 through a pipe line 55. As the pilot alters the position of his control 18, tension in the spring 49 will alter accordingly. For any given setting the diaphragm 51 will be flexed by centrifugal pressure reaching a corresponding value. When this value is obtained the space 41 above the relief valve 31 will be vented to the centrifugal pressure of the pump pressure which will be considerably lower than that normally operating in the space 41. The relief valve will therefore move away from its seating to limit the quantity of fuel which can reach the engine burners in the same way as it did in the Figure 1 arrangement when the port 25 was uncovered.

Although the invention has been shown in a simple system employing a single pump with burners of the direct injection type, it would be apparent that the invention can be embodied in other systems, for example in a system employing two pumps and having burners of the spill type.

I claim:

1. A liquid fuel supply system for an aircraft internal combustion turbine engine, comprising, in combination, means to supply fuel under pressure, a burner, and conduit means connecting the same, a control device settable by the pilot at definite settings corresponding to definite engine speeds, a throttle sensitive to changes in engine speed and to the setting of said pilot's control, to maintain automatically a predetermined engine speed regardless of altitude, and variable speed limiting means comprising a preselecting member operatively connected to shift with shifting of the pilot's control, a follow-up member operatively associated with said preselecting member, means operable as a function of change of engine speed to shift said follow-up member relative to said preselecting member; and means controllable by such shifting of the follow-up member as a result of tendency to exceed that speed for which the pilot's control is set, and in turn controllable by the preselecting member as such speed is substantially attained, to limit the quantity of fuel supplied to the burner irrespective of an overshot position of the throttle.

2. The liquid fuel supply system as in claim 1, characterized in that the means for supply of fuel under pressure is an engine-driven fuel pump, responsive to variations in engine speed, and developing a centrifugal pressure variable with its speed, and wherein the shifting means for said follow-up member is formed as a pressure-sensitive means operatively connected to said fuel pump for operation in accordance with variations in the latter's centrifugal pressure.

3. The liquid fuel supply system as in claim 1, wherein of the preselecting and follow-up members one is ported and the other is movable to open or close said port, a pressure source, variable in pressure in accordance with engine speed, operatively connected to one side of said port, and pressure-sensitive means operatively connected through said port to said pressure source, and operatively connected in turn to the fuel-limiting means, to actuate the latter in accordance with the relative positions of the preselecting and follow-up members.

4. The liquid fuel supply system as in claim 1, including a pressure balanced fuel by-pass valve, in the fuel line leading to the throttle, said preselecting and follow-up members cooperating to open or close a vent connected to one side of said by-pass valve, by their relative movement, and means sensitive to change of engine speed to open said vent and in turn to govern said by-pass valve for limitation of fuel supply independently of the throttle.

5. A liquid fuel supply system according to claim 4 in which the preselecting and follow-up members comprise cylinder and piston members of which one is coupled with the pilot's control and the other is exposed to centrifugal pressure of the pump so as to be longitudinally movable relatively to one another in order to close the vent of the fuel by-pass valve when the engine is below a speed corresponding with the setting of the pilot's control, and to open said vent when the engine tends to exceed said speed.

6. The liquid fuel supply system as in claim 1, including a pressure balanced fuel by-pass valve, in the fuel line leading to the throttle, said preselecting and follow-up members cooperating to open or close a vent connected to one side of said by-pass valve, by their relative movement, and means sensitive to change of engine speed to open said vent and in turn to govern said by-pass valve for limitation of fuel supply independently of the throttle, and further characterized in that the preselecting member comprises an abutment coupled with the pilot's control and the follow-up member comprises a spring loaded diaphragm normally closing the vent of the fuel by-pass valve, the abutment being operatively connected for movement with the pilot's control so as to vary the tension of the spring of the spring loaded diaphragm and hence to determine the pressure at which the diaphragm will move to open the vent, said vent being closed by the diaphragm when the engine is below a speed corresponding with the setting of the pilot's control, and being open when the engine tends to exceed said speed.

FREDERICK HENRY CAREY.

REFERENCES CITED

The following references are of record in the file of this patent:

UNITED STATES PATENTS

| Number | Name | Date |
|---|---|---|
| 2,442,149 | Ruth et al. | May 25, 1948 |